US008327735B2

(12) United States Patent
Suzuki

(10) Patent No.: US 8,327,735 B2
(45) Date of Patent: Dec. 11, 2012

(54) LEVER-TYPE OPERATING APPARATUS

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 9 days.

(21) Appl. No.: 12/984,645

(22) Filed: Jan. 5, 2011

(65) Prior Publication Data

US 2011/0162478 A1 Jul. 7, 2011

(30) Foreign Application Priority Data

Jan. 7, 2010 (JP) ................................ 2010-002206

(51) Int. Cl.
*F16C 1/10* (2006.01)

(52) U.S. Cl. ........................................ 74/502.2; 74/489

(58) Field of Classification Search ........................ None
See application file for complete search history.

(56) References Cited

U.S. PATENT DOCUMENTS 5,802,923 A * 9/1998 Hara .......................... 74/473.13
2003/0159529 A1* 8/2003 Samoto et al. ............... 73/865.9
2004/0099071 A1* 5/2004 Bai .................................. 74/56
2006/0117902 A1* 6/2006 Martin et al. ................... 74/512
2007/0193396 A1* 8/2007 Schlabach ........................ 74/512
2009/0308194 A1* 12/2009 Shahana ...................... 74/502.2
2010/0307282 A1* 12/2010 Yaguchi .......................... 74/504

* cited by examiner

*Primary Examiner* — Troy Chambers
*Assistant Examiner* — Gregory Prather
(74) *Attorney, Agent, or Firm* — Sughrue Mion, PLLC

(57) ABSTRACT

A lever-type operating apparatus is provided with a lever provided in a vicinity of a handgrip on a handlebar and a case fixed to the handlebar. A rotational shaft is provided in the case. The lever is rotatably supported by the rotational shafts. A return spring is provided in the case. The lever is normally urged to an initial state by the return spring. A detector is provided in the case. The detector is configured to detect a rotational operation angle of the lever. A driving source of a vehicle is controlled based on the rotational operation angle detected by the detector. The detector and the return spring are mounted on to the rotational shaft.

9 Claims, 5 Drawing Sheets

LEVER-TYPE OPERATING APPARATUS

BACKGROUND OF THE INVENTION

1. Field of the Invention

The present invention relates to a lever-type operating apparatus to be used, for example, for controlling an engine of a vehicle based on a rotational operation angle of a lever.

2. Related Art

In so-called riding type vehicles such as watercraft or snowmobiles, they normally have a steering handlebar, and a lever-type throttle operating apparatus for controlling an engine may be provided on the handlebar. This lever-type throttle operating apparatus includes a lever and a case. The lever is installed in a vicinity of a handgrip mounted at a distal end of the handlebar so that a rider can rotationally operate the lever while gripping the handgrip. The case is fixed to the handlebar and rotatably supports the lever.

A lever-type throttle operating apparatus according to related art (which does not correspond to prior art) includes, for example, a lever which can rotate about a rotational shaft formed within the case, a link mechanism which extends from a proximal end portion of the lever and is operated in association with a rotational operation of the lever within the case, and a detection sensor for detecting an operation amount of the link mechanism. An operation amount of the link mechanism is detected by the detection sensor so as to detect a rotational operation angle of the lever to thereby control an engine of a vehicle based on the rotational operation amount of the lever so detected.

In the above related lever-type throttle operating apparatus, however, since there is provided the link mechanism which is operated in association with the lever, there may be a drawback that the apparatus is made large in whole. Namely, in the related apparatus, the link mechanism is provided so as to extend from the proximal end portion of the lever and the detection sensor is provided at a distal end portion of the link mechanism. Therefore, a large case is needed, so that a size of a whole of the apparatus becomes large.

SUMMARY OF THE INVENTION

One or more embodiments of the invention provide a lever-type operating apparatus which can downsizing the apparatus.

In accordance with embodiments of the invention, a lever-type operating apparatus is provided with: a lever 1 provided in a vicinity of a handgrip G on a handlebar H; a case 2 fixed to the handlebar H; a rotational shaft L, L1 provided in the case 2; a return spring 6, 7 provided in the case 2; and a detector 3, 4 provided in the case 2. The lever 1 is rotatably supported by the rotational shafts L, L1. The lever 1 is normally urged to an initial state by the return spring 6, 7. The detector 3, 4 is configured to detect a rotational operation angle of the lever 1. A driving source of a vehicle is controlled based on the rotational operation angle detected by the detector 3, 4. The detector 3, 4 and the return spring 6, 7 are mounted on to the rotational shaft L, L1 of the lever 1.

Other aspects and advantages of the invention will be apparent from the following description and the appended claims.

DETAILED DESCRIPTION OF THE EXEMPLARY EMBODIMENTS

Figure 1:
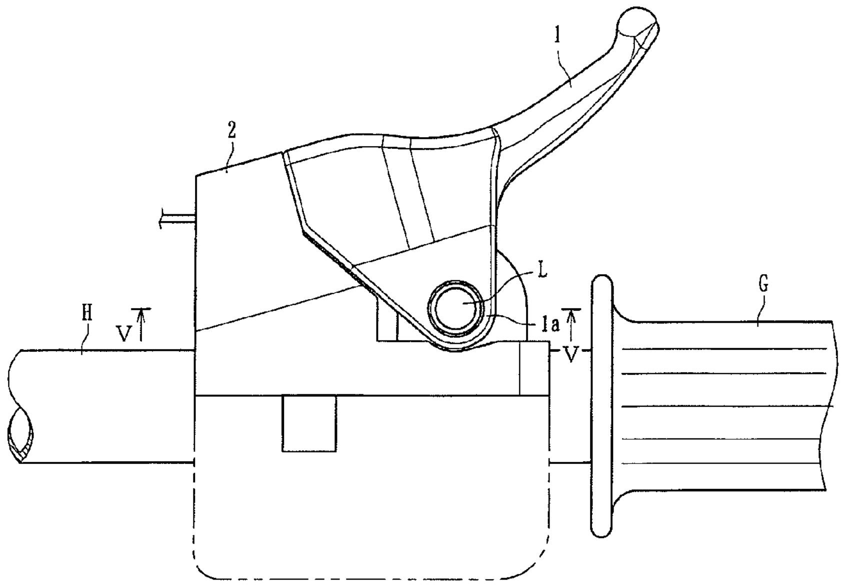
FIG. 1 is a front view showing a lever-type operating apparatus according to a first exemplary embodiment of the invention.
Figure 2:
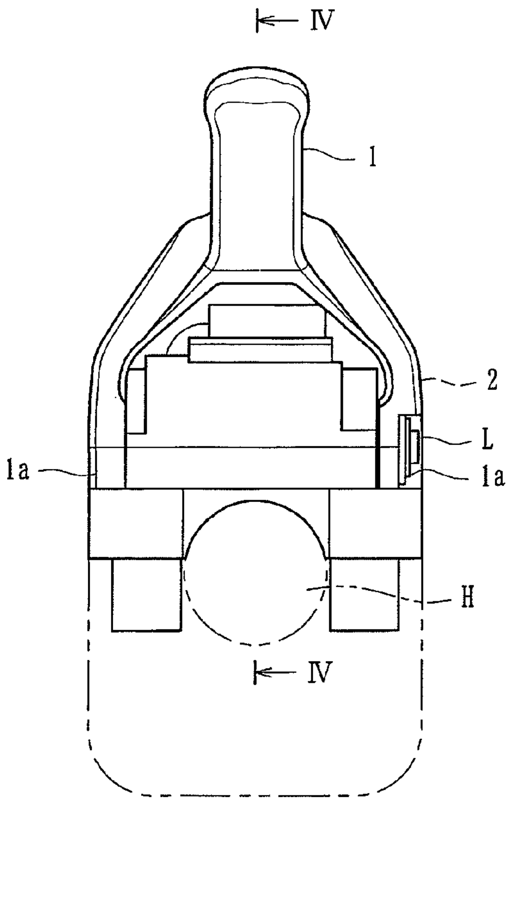
FIG. 2 is a right side view showing the lever-type operating apparatus.
Figure 3:
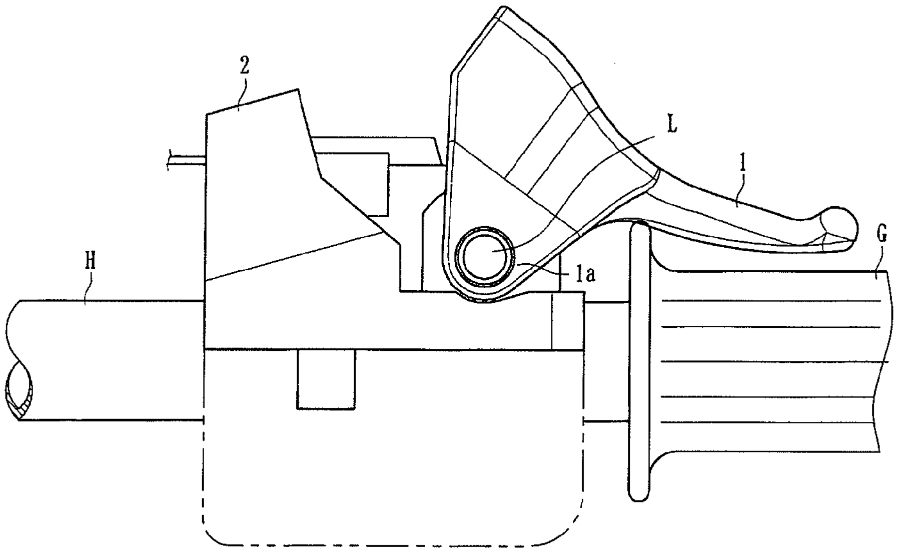
FIG. 3 is a front view showing a state in which a lever of the apparatus is rotated.

Hereinafter, specific exemplary embodiments of the invention will be described by reference to drawings.

A lever-type operating apparatus according to a first exemplary embodiment is to be fixed to a steering handlebar provided on a so-called riding-type vehicle such as a watercraft or a snowmobile and used for controlling an engine of the vehicle. (The engine of the vehicle may be an internal combustion engine, an electric motor, and so on.) As is shown in FIGS. 1 to 5, the lever-type operating apparatus includes mainly a lever 1, a case 2, a magnet 3 and an angle sensor 4 which make up a detection device, return springs (6, 7), and a fixed friction plate 8 and a movable friction plate 9 which make up a resistance production device. In the drawings, reference character H denotes a steering handlebar provided on the vehicle, and reference character G denotes a handgrip which is mounted at a distal end of the handlebar H and to be gripped by a rider.

The lever 1 is installed in the case 2 which is installed in proximity to the handgrip G mounted at the distal end of the handlebar H so as to project from the case 2, so that the rider can rotationally operate the lever 1 while gripping the handgrip G. For example, the lever 1 can be rotationally operated by the rider who extends his index finger or middle finger with which he or she grips on the handgrip G so as to pull the lever 1 towards him. When the lever 1 according to the embodiment is pulled towards the rider, the lever 1 rotates against urging forces of the return springs (6, 7), which will be described later into a state shown in FIG. 3. A pair of connecting portions 1*a* which are connected to a rotational shaft L are formed at a proximal end portion of the lever 1.

The case 2 is fixed to the handlebar H. In the case 2, the rotational shaft L for rotatably supporting the lever 1 is provided. The rotational shaft L according to the first exemplary embodiment is made up of a shaft which is connected to the connecting portions 1*a* to thereby be able to rotate in association with the rotation of the lever 1. The rotational shaft L is mounted in the case 2 in a both-ends-supported construction in which the rotational shaft L is rotatably supported in the case 2 at both ends thereof. By this construction, since the rotational shaft L is mounted in the case 2 in the both-ends-supported construction in which the rotational shaft L is rotatably supported in the case 2 at both the ends thereof, a whole of the apparatus can be downsized while realizing a stable rotation of the lever 1.

Figure 4:
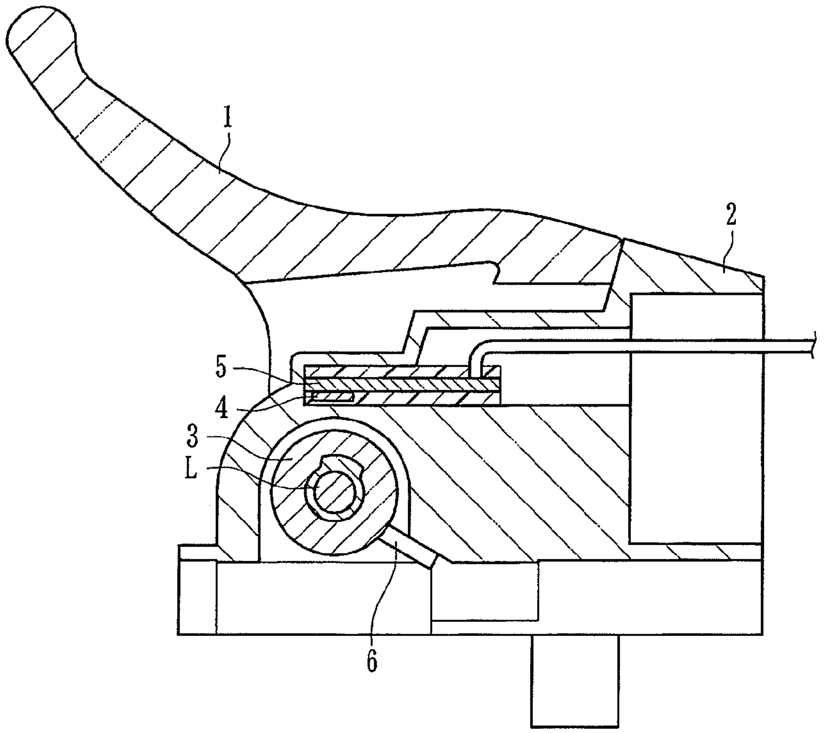
FIG. 4 is a sectional view taken along a line IV-IV in FIG. 2.
Figure 5:
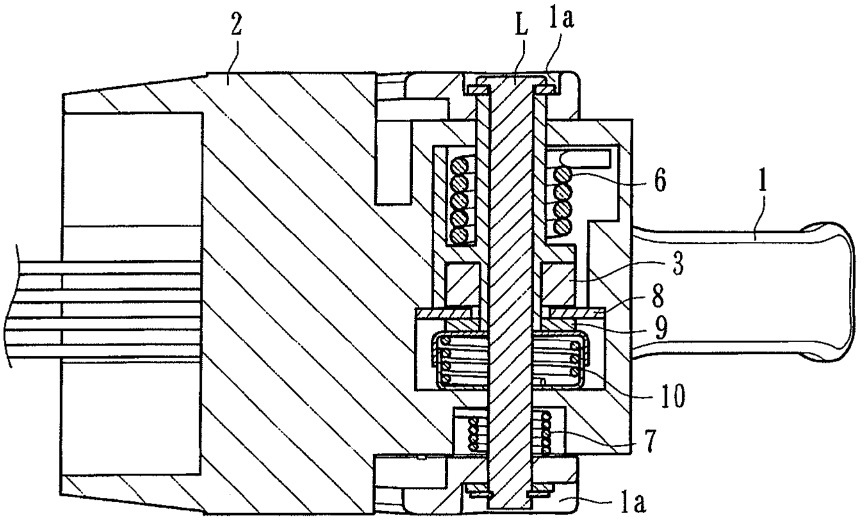
FIG. 5 is a sectional view taken along a line V-V in FIG. 1.
Figure 6:
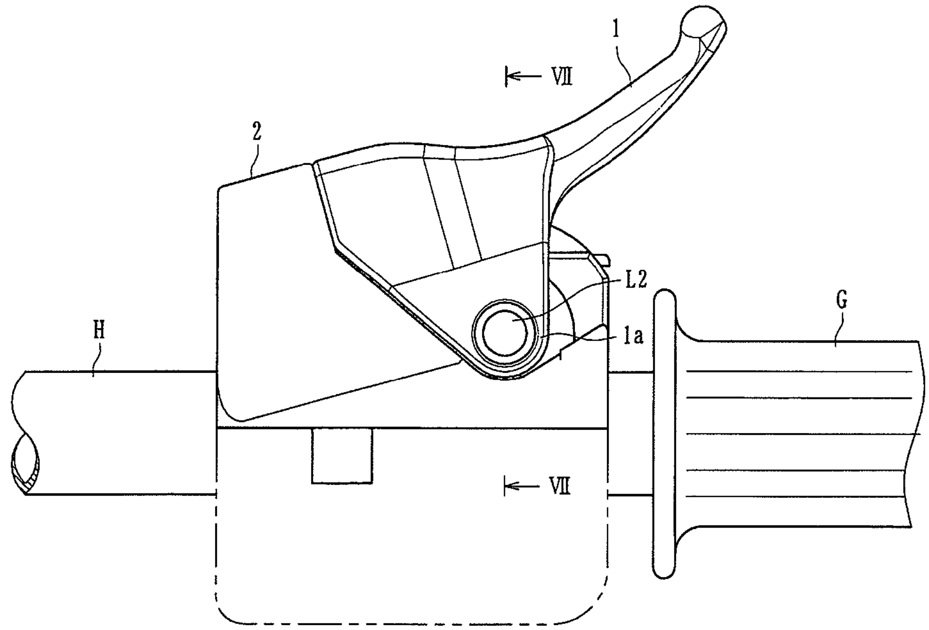
FIG. 6 is a front view showing a lever-type operating apparatus according to a second exemplary embodiment of the invention.
Figure 7:
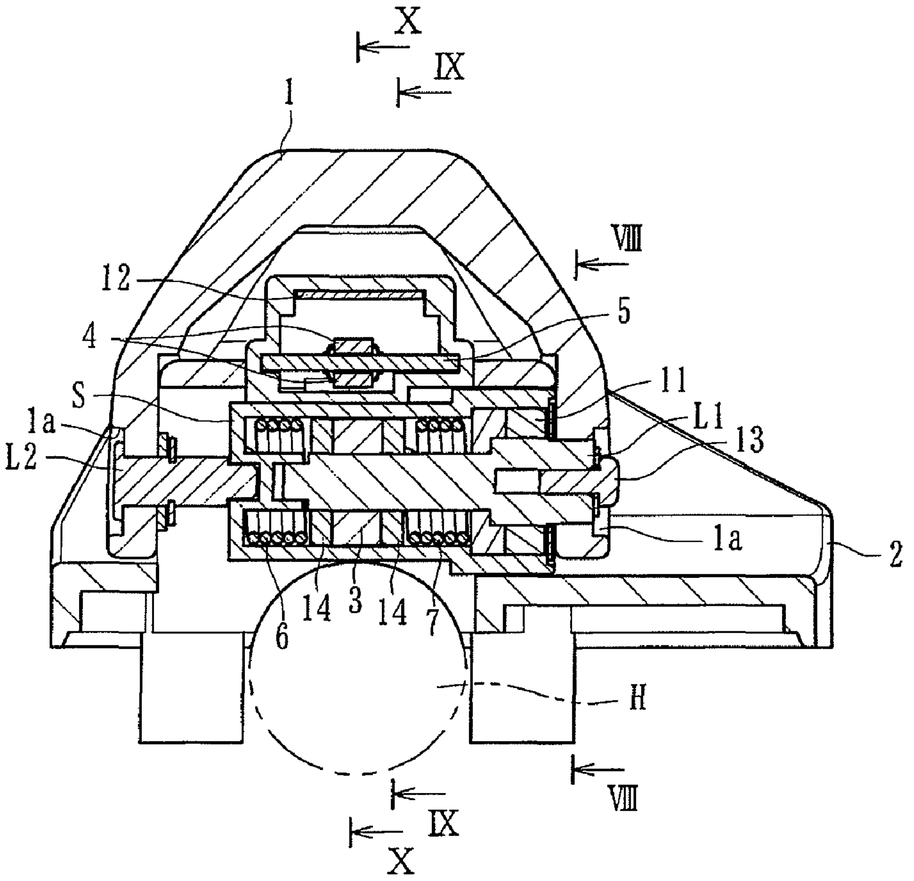
FIG. 7 is a sectional view taken along a line VII-VII in FIG. 6.
Figure 8:
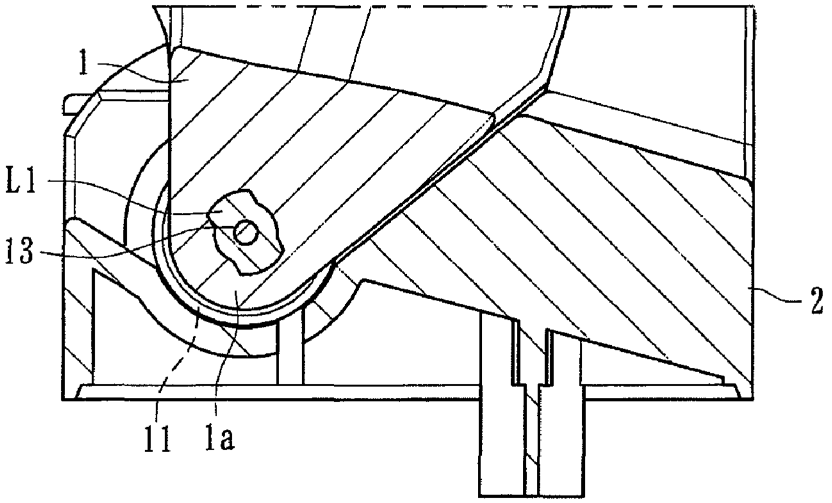
FIG. 8 is a sectional view taken along a line VIII-VIII in FIG. 7.
Figure 9:
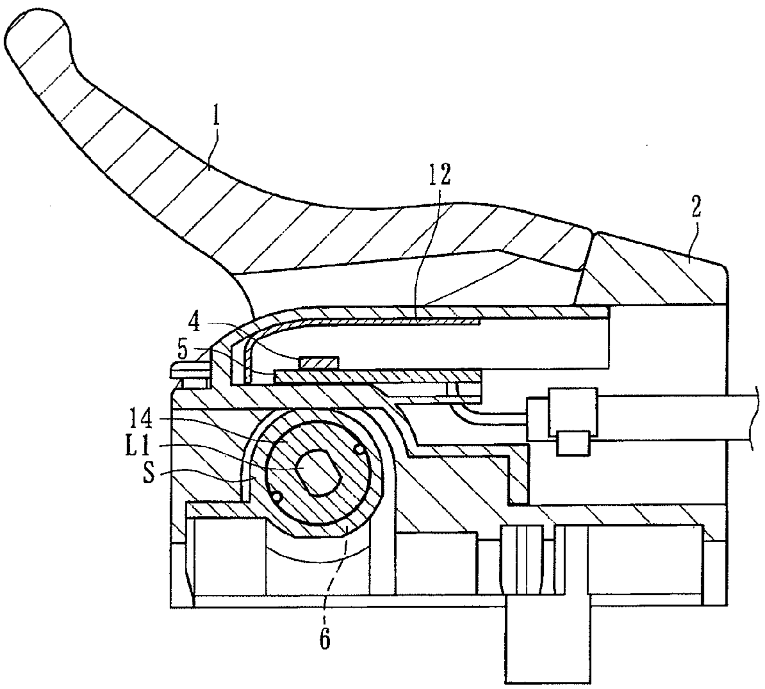
FIG. 9 is a sectional view taken along a line IX-IX in FIG. 7.
Figure 10:
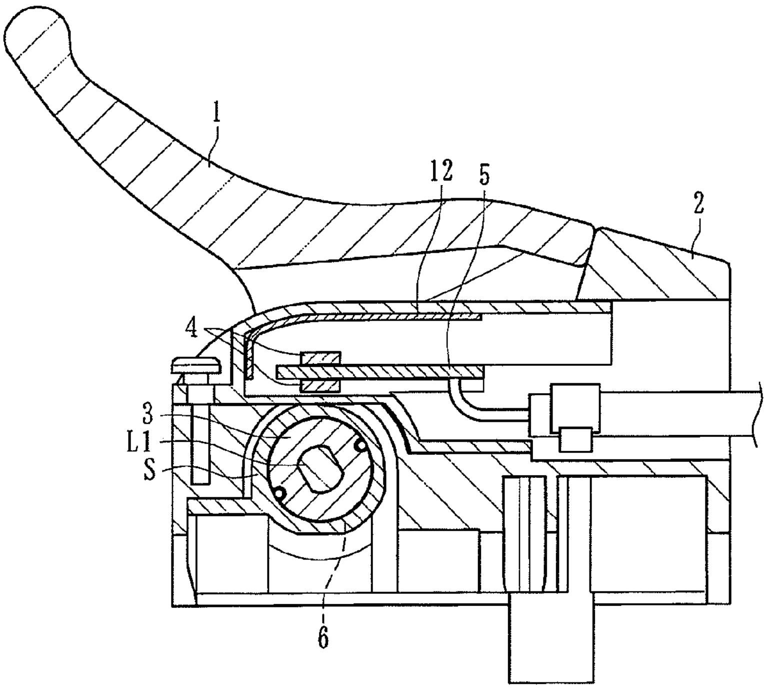
FIG. 10 is a sectional view taken along a line X-X in FIG. 7.

The detection device is installed within the case 2. The detection device includes a sensor for detecting a rotational operation angle of the lever 1. In the first exemplary embodiment, as is shown in FIGS. 4, 5, the detection device is structured by a magnet 3 which is assembled on to the rotational shaft L so as to rotate together with the rotational shaft L and an angle sensor 4 which detects a change in magnetism from the magnet 3 so as to detect the rotational operation angle of the lever 1.

The angle sensor 4 is made up of a chip-like element which can detect the change in magnetism from the magnet 3 so as to be able to detect the rotational angle. The angle sensor 4 is installed on a circuit board 5 on which a predetermined circuit is formed through printing and is fixed to a position lying close to the magnet 3 (a position close to the magnet 3 within the case 2) so as to detect rotational angles of the magnet 3 and the rotational shaft L. Namely, the rotational shaft L rotates in association with the rotation of the lever 1, and the magnet 3 rotates together with the rotational shaft L. Then, an output signal from the angle sensor 4 is increased or decreased as a magnetic field produced from the magnet 3 changes. Thus, the angle sensor 4 can detect the rotational operation angle of the lever 1 based on the output signal from the angle sensor 4.

The signal is sent to an ECU provided on the riding-type vehicle via a wiring cord installed to extend from the circuit board 5, where a controlling of the engine (an output control based on the rotational angle of the lever 1) is effected based on the signal. According to this lever-type operating apparatus, since the rotational operation angle of the lever 1 can be detected in a non-contact fashion, compared with one having a mechanical mechanism such as a potentiometer, the durability of the apparatus can be increased, and the accuracy thereof can also be enhanced. The angle sensor 4 and the circuit board 5 are molded of predetermined resins, and hence, even in case a seal function between the case 2 and the rotational shaft L is damaged to call for an intrusion of water thereinto, the angle sensor 4 and the circuit board 5 can be prevented from being be subjected to intruding water.

The return springs (6, 7) are installed within the case 2 and normally urge the lever 1 towards an initial state (a state before a rotational operation of the lever 1 occurs) thereof. Namely, the return springs (6, 7) are each made up of a restoration spring which is fixed to the case 2 side at one end and is fixed to the rotational shaft L at the other end thereof, and when the rotational shaft L is rotated, the return springs are made to urge the rotational shaft L to its original state by their restoring forces.

The lever 1 is designed to naturally return to its initial position (a position before the lever 1 is rotationally operated) by the urging forces of the return springs (6, 7) as the rider releases the operation force exerted on the lever 1. In the first exemplary embodiment, a pair of return springs (6, 7) are installed, and a return spring 6 is installed at one end portion (an upper end portion in FIG. 5) of the rotational shaft L and a return spring 7 is installed at the other end portion (a lower end portion in the same figure) of the rotational shaft L.

The fixed friction plate 8 and the movable friction plate 9, which make up the resistance production device, produce a predetermined resistance when the lever 1 is rotationally operated. The fixed friction plate 8 is fixed to the case side 2 while allowing the rotational shaft L to pass through a substantially center thereof and is installed so as to be brought into abutment with a surface of the friction plate 9 on a surface thereof. The movable friction plate 9 is pressed against the surface of the fixed friction plate 8 on the surface thereof by a coil spring 10 while being fixed to the rotational shaft L.

Thus, the fixed friction plate 8 and the movable friction plate 9 are pressed against each other on the surfaces thereof by the coil spring 10. Since the movable friction plate 9 rotates as the rotational shaft L rotates in association with the rotational operation of the lever 1, a friction force is designed to be produced between the surfaces of the fixed friction plate 8 and the movable friction plate 9. This friction force makes a resistance when the lever 1 is rotationally operated, whereby the rider can feel a predetermined operating sensation. In the first exemplary embodiment, while the resistance is produced by the fixed friction plate 8 and the movable friction plate 9 when the lever is rotationally operated, another resistance production means (a resistance produced is not limited to the friction force) may be adopted in place of the friction plates.

Here, in this embodiment, the magnet 3 making up the detection device, the return springs (6, 7), the fixed friction plate 8 and the movable friction plate 9 (including the coil spring 10) are all assembled on to the rotational shaft L of the lever 1. Namely, the magnet 3 and the movable friction plate 9 are fixed to predetermined positions on the rotational shaft L, and the return springs (6, 7), the fixed friction plate 8 and the coil spring 10 are fitted on the rotational shaft L. In a condition where these constituent elements are concentrically assembled, the rotational shaft L is connected to the connecting portions 1*a* of the lever 1.

According to the first exemplary embodiment, when the lever 1 is rotationally operated, the rotational shaft L rotates in association therewith. Therefore, a rotational operation angle of the lever 1 can be detected by detecting a rotational angle of the magnet 3 by the detection sensor 4, and the engine is controlled in accordance with the rotational operation angle of the lever 1 (an engine output control is executed based on the rotational angle of the lever 1). In addition, when the rotational shaft L is rotated, in addition to a force resisting the urging forces of the return springs (6, 7), a force resisting the resistance (the friction resistance) by the resistance production device made up of the fixed friction plate 8 and the movable friction plate 9 is required, so that a predetermined operating feeling can be obtained.

In the first exemplary embodiment, while there is provided the resistance production device made up of the fixed friction plate 8 and the movable friction plate 9, a configuration may be adopted in which the resistance production device is not provided and instead, the detection device (the magnet 3 and the angle sensor 4) and the return springs (6, 7) are assembled on to the rotational shaft L of the lever 1. In addition, in the first exemplary embodiment, while there is provided the pair of return springs (6, 7), a configuration may be adopted in which only either of the return springs (6, 7) is assembled on to the rotational shaft L.

Further, according to the first exemplary embodiment, since the rotational shaft L is made up of the shaft which can rotate together with the lever 1 and is mounted in the case 2 in the both-ends-supported construction in which the rotational shaft L is rotatably supported on the case 2 at both the ends thereof, the apparatus can be downsized while realizing a stable rotation of the lever 1. Since the rotational shaft 1 is connected to the pair of connecting portions 1*a* at the proximal end portion of the lever 1 at both the ends thereof, the lever 1 can rotate more stably and smoothly.

Next, a lever-type operating apparatus according to a second exemplary embodiment of the invention will be described. Similar to the lever-type operating apparatus of the first exemplary embodiment, the lever-type operating apparatus of the second exemplary embodiment is to be fixed to a steering handlebar provided on a so-called riding-type vehicle such as a watercraft or a snowmobile, and used for controlling an engine of the vehicle. As is shown in FIGS. 6 to 10, the lever-type operating apparatus includes mainly a lever 1, a case 2, a magnet 3 and angle sensors 4 which make up a detection device, return springs (6, 7), an oil seal 11 as a seal device and a magnetism shut-off plate 12. The same reference numerals will be given to constituent elements which are similar to those of the first exemplary embodiment, and a detailed description thereof will be omitted.

The lever 1 according to the second exemplary embodiment can rotate about rotational shafts L1, L2. The rotational shaft L1 is made up of a shaft which can rotate in association with the rotation of the lever 1, and the rotational shaft L2 is made up of a pin-like fixed shaft which is fixed to the case 2. Namely, the lever 1 is made to rotate relatively to the rotational shaft L2, while the lever 1 is made to rotate together with the rotational shaft L1. A distal end of the rotational shaft L2 is fitted in a recess portion formed in one lateral surface of a sub-case S so as to be supported therein, and a pin 13 is fitted in one end of the rotational shaft L1.

The sub-case S is fixed to the case 2, holds the other end portion of the rotational shaft L1 rotatably and accommodates the magnet 3 and the return springs (6, 7) which are assembled to the rotational shaft L1. In addition, a pair of spring bearing portion 14 are also accommodated in the sub-case S which bear end portions of the return springs (6, 7), and the magnet 3 is installed between the pair of spring receiving portions 14.

Thus, the rotational shaft L1 is supported rotatably on the sub-case which accommodates the magnet 3 and the return springs (6, 7) by being supported rotatably on the case 2 at one end (a right end in FIG. 7) and fixed in place within the case 2 at the other end (a left end in the same figure) and is supported rotatably while being sealed with the oil seal 11 (the seal member) at the one end so as to prevent the intrusion of water. In the second exemplary embodiment, when the lever is rotationally operated, since the rotational shaft L1 rotates while the intrusion of water is prevented by the oil seal 11, a predetermined resistance can be produced. Namely, the oil seal 11 has the water preventing function between the rotational shaft L1 and the case 2 and the function as the resistance producing portion.

In the second exemplary embodiment, the angle sensors 4 are positioned in positions in proximity to the magnet 3 within the case 2. Similar to the angle sensor 4 of the first exemplary embodiment, the angle sensors 4 detect a change in magnetism from the magnet 3 to detect a rotational angle of the magnet 3 and are mounted on a circuit board 5 on which a predetermined circuit is formed through printing. Particularly, in the second embodiment, the angle sensors 4 are mounted on front and rear surfaces of the circuit board 5, and two output signals are outputted from the angle sensors 4. As this occurs, in the event that output voltages of the two output signals are made to change in opposite directions, in case one of the angle sensors or a wiring thereof fails, the output voltage from the failed angle sensor 4 is reduced and the sum of the output signals differs. Thus, it can be recognized that there is occurring a defect in the angle sensor 4 in question or the wiring thereof. Even in this case, various controls can be executed by the other angle sensor 4, thereby making it possible to secure the safety.

The magnetism shut-off plate 12 is made up of a member which is installed so as to cover the angle sensor 4 (as to cover the upper angle sensor 4) to thereby shut off magnetism which attempts to access to the angle sensor 4 from an opposite side (an upper side in the figure) to the position where the magnet 3 is installed (a position at a lower portion in the figure). By this configuration, noise can be suppressed which would otherwise be produced by magnetism which attempts to access to from the opposite side (the upper side in the figure), thereby making it possible to detect the rotational operation angle of the lever with better accuracy.

Here, in the second exemplary embodiment, the magnet 3 making up the detection device and the return springs (6, 7) (including the spring receiving portions 14) are all assembled on to the rotational shaft L1 of the lever 1. Namely, the magnet 3 and the spring receiving portions 14 are fixed to predetermined positions on the rotational shaft L1, and the return springs (6, 7) are fitted on the rotational shaft L1. In a condition where these constituent elements are concentrically assembled, the rotational shaft L1 is mounted in the case 2 via the sub-case S.

According to the second exemplary embodiment, when the lever 1 is rotationally operated, the rotational shaft L1 rotates in association therewith. Therefore, a rotational operation angle of the lever 1 can be detected by detecting a rotational angle of the magnet 3 by the detection sensors 4, and the engine is controlled in accordance with the rotational operation angle of the lever 1 (that is, an engine output control is executed based on the rotational angle of the lever 1). In the second exemplary embodiment, while there is provided the pair of return springs (6, 7), a configuration may be adopted in which only either of the return springs (6, 7) is assembled on to the rotational shaft L1.

Further, according to the second exemplary embodiment, the rotational shaft L1 is made up of a shaft which rotates in association with the rotation of the lever 1. One end of the rotational shaft L1 is rotatably supported on the case 2 and the other end of the rotational shaft L1 is rotatably supported on the sub-case S that is fixed within the case 2 and that accommodates the magnet 3 which makes up the detection device and the return springs (6, 7). In addition, the apparatus includes the oil seal 11 (the seal member) which can prevent the intrusion of water while rotatably supporting the rotational shaft L1 at the one end thereof. Therefore, a seal means such as the oil seal 11 does not have to be provided at the other end portion of the rotational shaft L1, thereby making it possible to reduce the production cost.

According to the first and second exemplary embodiments, since the magnet 3 of the detection device which detects the rotational operation angle of the lever 1 and the return springs (6, 7) which normally urge the lever 1 towards the initial state thereof are assembled on to the rotational shaft (L, L1) of the lever 1. When the apparatus of the exemplary embodiments is compared with the related lever-type throttle operating apparatus which includes the detection sensor for detecting the rotational angle of the rotational shaft via the link mechanism, the whole of the apparatus can be downsized.

While specific exemplary embodiments have been described, the invention is not limited thereto. For example, in place of the detection device which is made up of the magnet 3 and the angle sensor 4, a detection device having a mechanical mechanism such as a potentiometer for detecting a rotational operation angle of the lever may be provided on to a lever 1. In addition, in the exemplary embodiments, while the lever-type operating apparatus is described as being applied to the watercraft or the snowmobile, the invention may be applied to a lever-type operating apparatus for a so-called riding-type vehicle of a different type (such as an ATV or a buggy) in place of the watercraft or the snowmobile.

The invention can be applied to any lever-type operating apparatus which has a different external shape or to which a different function is added, provided that it is such that a detection device and return springs are assembled on to a rotational shaft of a lever.

In accordance with the embodiments of the invention, a lever-type operating apparatus is provided with: a lever 1 provided in a vicinity of a handgrip G on a handlebar H; a case 2 fixed to the handlebar H; a rotational shaft L, L1 provided in the case 2, wherein the lever 1 is rotatably supported by the rotational shafts L, L1; a return spring 6, 7 provided in the case 2, wherein the lever 1 is normally urged to an initial state by the return spring 6, 7; and a detector 3, 4 provided in the case 2, wherein the detector 3, 4 is configured to detect a rotational operation angle of the lever 1, and wherein a driving source of a vehicle is controlled based on the rotational operation angle detected by the detector 3, 4. The detector 3, 4 and the return spring 6, 7 are mounted on to the rotational shaft L, L1 of the lever 1.

According to this structure, since the detector for detecting the rotational operation angle of the lever and the return spring which normally urges the lever towards the initial state thereof are assembled on to the rotational shaft of the lever, the apparatus can be downsized.

In the above structure, a resistance producing portion 8, 9, 11 for producing a resistance to a rotational movement of the lever 1 may be mounted on to the rotational shaft L. L1.

According to this structure, since there is provided the resistance producing portion for producing the predetermined resistance to the movement of the lever and the resistance producing portion is assembled on to the rotational shaft of the lever together with the detector and the return spring, the apparatus can be downsized while increasing the operability of the lever.

In the above structure, the rotational shaft L may be integrally rotatable with the lever, and both ends of the rotational shaft L is rotatably supported on the case 2.

According to this structure, the apparatus can be downsized while realizing a stable rotation of the lever.

In the above structure, a sub-case S may be provided in the case 2, and the detector 3, 4 and the return spring 6, 7 may be accommodated in the sub-case. The rotational shaft may include a shaft member L1 that is integrally rotatable with the lever 1. One end of the shaft member L1 may be rotatably supported on the case 2. The other end of the shaft member L1 may be rotatably supported on the sub-case. The one end of the shaft member L1 may be rotatably supported by a seal member for providing a waterproofing function.

According to this structure, no seal member needs to be provided at the other end portion, thereby making it possible to reduce the production cost.

In the above structure, the detector may include: a magnet 3 mounted on to the rotational shaft L, L1 so as to integrally rotate with the rotational shaft L, L1; and an angle sensor 4 provided in the case 2 and configured to detect a change in magnetism from the magnet 3 so as to detect the rotational operation angle of the lever 1.

According to this structure, the rotational operation angle of the lever can be detected with good accuracy.

In the above structure, a magnetism shut-off plate 12 that covers the angle sensor 4 and configured to shut off magnetism which directs to the angle sensor from an opposite side of the magnet 3 may be provided.

According to this structure, noise which would otherwise be produced by magnetism which attempts to access from the opposite side can be suppressed, thereby making it possible to detect the rotational operation angle of the lever with better accuracy.

While description has been made in connection with a specific exemplary embodiments and modifications thereof, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1 lever (lever); 2 case; 3 magnet (detector); 4 angle sensor (detector); 5 circuit board; 6 return spring; 7 return spring; 8 fixed friction plate (resistance producing portion); 9 movable friction plate (resistance producing portion); 10 coil spring; 11 oil seal (seal member); 12 magnetism shut-off plate; 13 pin; H handlebar; G handgrip; S sub-case; L, L1 rotational shaft.

What is claimed is:

1. A lever-type operating apparatus comprising:

a lever provided in a vicinity of a handgrip on a handlebar;

a case fixed to the handlebar;

a rotational shaft provided in the case, wherein the lever is rotatably supported by the rotational shaft;

a return spring provided in the case, wherein the lever is normally urged to an initial state by the return spring;

a detector provided in the case, wherein the detector is configured to detect a rotational operation angle of the lever, and wherein a driving source of a vehicle is controlled based on the rotational operation angle detected by the detector; and a resistance producing portion configured to produce a resistance to a rotational movement of the lever, wherein a portion of the detector and the return spring are mounted on to the rotational shaft of the lever, wherein the resistance producing portion is mounted on to the rotational shaft, wherein the resistance producing portion comprises a fixed friction plate, a movable friction plate, and a coil spring for urging the movable friction plate toward the fixed friction plate, and wherein the fixed friction plate, the movable friction plate and the coil spring are serially aligned in a direction in which the rotational shaft extends.

2. The apparatus according to claim 1, wherein the rotational shaft comprises a shaft member that is integrally rotatable with the lever, and wherein both ends of the shaft member is rotatably supported on the case.

3. The apparatus according to claim 1, further comprising:

a sub-case provided in the case, wherein the detector and the return spring are accommodated in the sub-case, wherein the rotational shaft comprises a shaft member that is integrally rotatable with the lever, wherein one end of the shaft member is rotatably supported on the case, wherein the other end of the shaft member is rotatably supported on the sub-case, and wherein said one end of the shaft member is also rotatably supported by a seal member for providing a waterproofing function.

4. The apparatus according to claim 1, wherein the detector includes:

a magnet mounted on to the rotational shaft so as to integrally rotate with the rotational shaft; and an angle sensor provided in the case and configured to detect a change in magnetism from the magnet so as to detect the rotational operation angle of the lever.

5. The apparatus according to claim 4, further comprising:
a magnetism shut-off plate that covers the angle sensor and configured to shut off magnetism which directs to the angle sensor from an opposite side of the magnet.

6. The apparatus according to claim 3, wherein the seal member is positioned within the sub-case.

7. The apparatus according to claim 4, wherein the angle sensor is mounted in the case at a position that is exterior to the shaft.

8. The apparatus according to claim 1, wherein the detector and the return spring are serially aligned in a direction in which the rotational shaft extends.

9. The apparatus according to claim 1, wherein the detector, the return spring, and the resistance producing portion are serially aligned in the direction in which the rotational shaft extends.

* * * * *